United States Patent [19]
Dandurand

[11] 3,837,624
[45] Sept. 24, 1974

[54] APPARATUS FOR INSTALLING PULL LINES

[76] Inventor: Thomas G. Dandurand, 3195 Elcanto Dr., Colorado Springs, Colo. 80907

[22] Filed: Sept. 28, 1973

[21] Appl. No.: 401,619

[52] U.S. Cl. ............................ 254/134.4, 226/97
[51] Int. Cl. ........................................ E21c 29/16
[58] Field of Search ............ 254/134.3 R, 134.3 FT, 254/134.4; 226/97; 15/104.06

[56] References Cited
UNITED STATES PATENTS

| | | | |
|---|---|---|---|
| 1,999,559 | 4/1935 | Brendlin | 254/134.4 X |
| 3,091,433 | 5/1963 | Riley | 254/134.4 |
| 3,244,402 | 4/1966 | Ensley | 254/134.4 |
| 3,301,531 | 1/1967 | Corsiglia | 254/134.4 |
| 3,689,031 | 9/1972 | Ruddick et al. | 254/134.4 |

Primary Examiner—Othell M. Simpson
Attorney, Agent, or Firm—Merchant, Gould, Smith & Edell

[57] ABSTRACT

The disclosure is directed to apparatus for pressurizing and installing a pull line into conduit. Each of the two embodiments disclosed consists of a portable housing defining an internal pressure chamber in which a predetermined length of line or cord is stored. The housing has an outlet to which a flexible hose is connected, the hose terminating in a pressure fitting which sealably engages the conduit end. The line or cord is threaded through the hose and pressure fitting, and a carrier adapted to move through the conduit upon application of pressure is removably connected to the cord end. An electrically operated blower disposed within the housing generates pressure within the chamber, which in turn is applied through the pressure fitting to the conduit. The carrier is accordingly moved through the conduit by the pressure, carrying the cord with it for subsequent use as a pull line for electrical conducting wire or the like.

23 Claims, 7 Drawing Figures

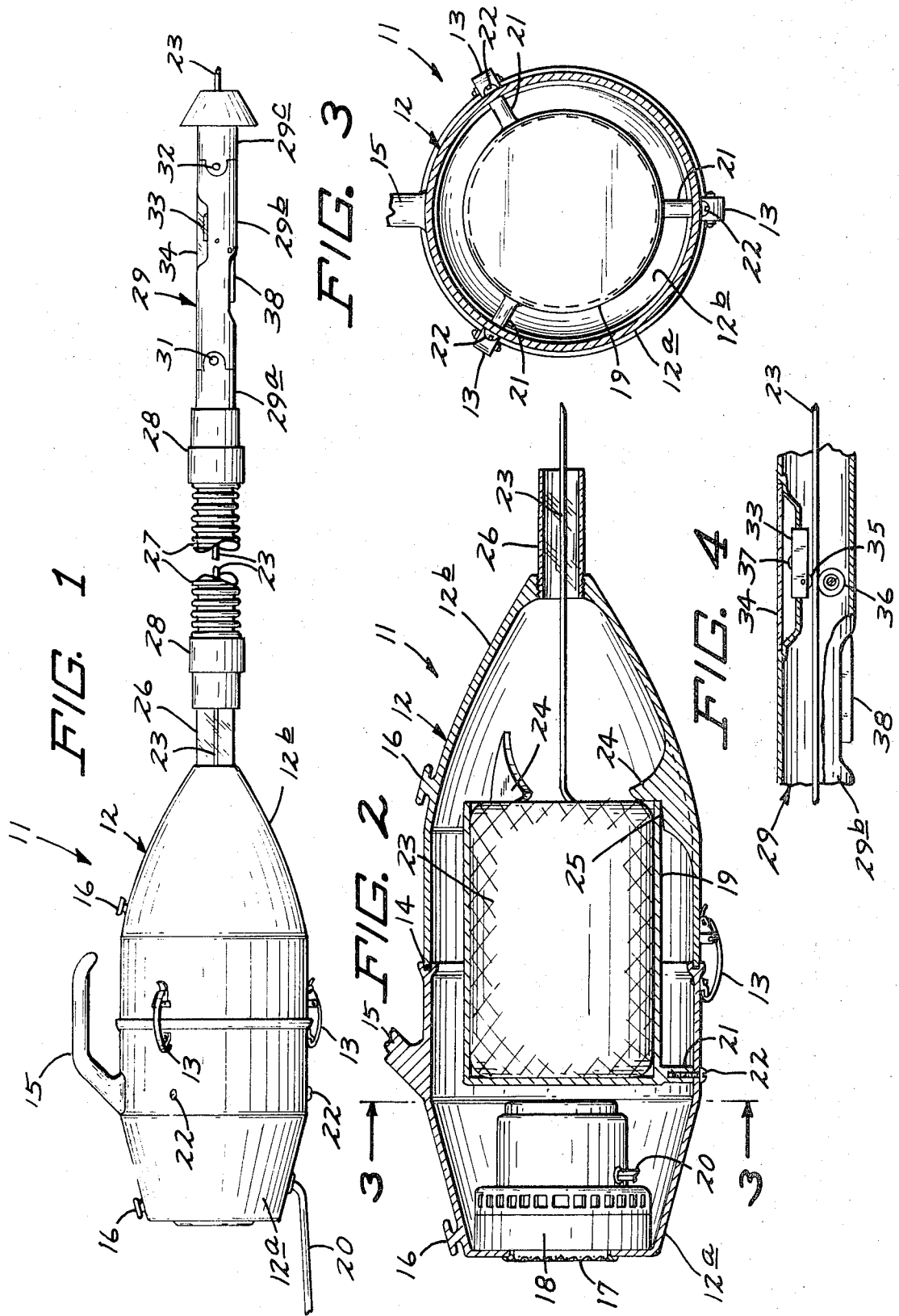

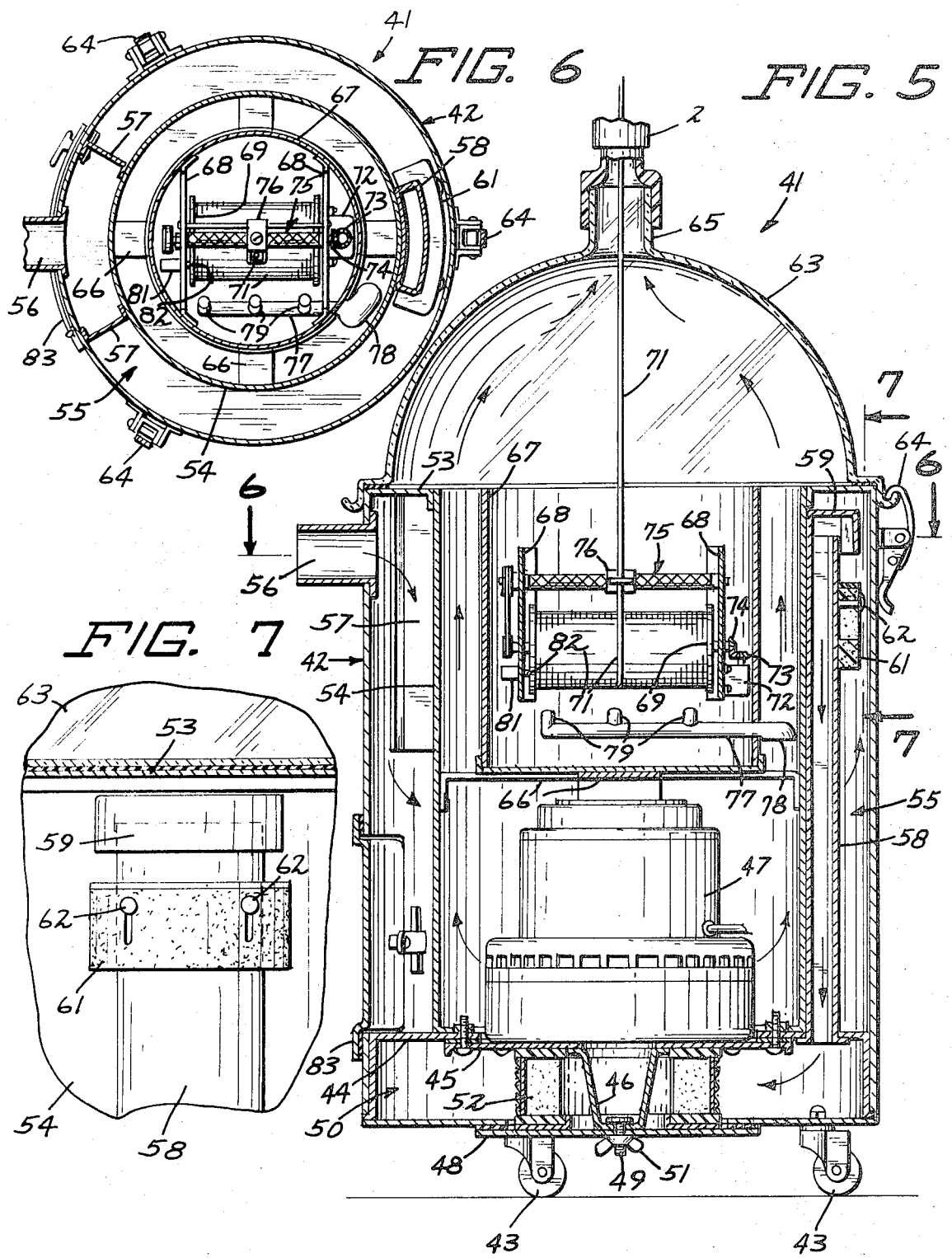

APPARATUS FOR INSTALLING PULL LINES

The invention is related to improved apparatus for pressurizing and installing a pull line into conduit.

The provision of electrical circuits in residential, commercial and industrial structures conventionally involves the initial placement of junction boxes and interconnecting conduit which is either rigid or flexible. Appropriate lengths of electrical conducting wire are drawn through each length of conduit interconnecting two junction boxes, and the wire ends are then electrically connected in a desired manner.

Electrical conducting wire is for the most part copper, the conductance of which is directly proportional to its cross sectional size. The degree of difficulty in installing a length of electrical conducting wire in a conduit run varies with the wire size, the length of the run and the number and type of bends in the run. For most residential applications, in which the wire cross sectional size is relatively small and the conduit runs are relatively short and have few bends, wiring is accomplished through the use of a "fish tape", which consists of a thin metal strip or band of predetermined length which can be pushed through the conduit and is capable of following each bend without hindrance. After the fish tape has been passed through a length of conduit, the electrical conducting wire is connected to the leading fish tape end and drawn back through the conduit.

In many commercial and industrial applications, the fish tape is incapable of being inserted through conduit runs because of their extreme length and number of bends. Consequently, it has become the practice of electricians to insert a small carrier into the conduit, which normally takes the form of a resilient sponge-like, to connect a length of lightweight string or cord to the plug, and to either pressurize the conduit behind the plug or create a partial vacuum in front of the plug, causing it to move through the conduit and carrying the lightweight cord with it. Upon reaching the desired junction box, the plug is removed from the lightweight cord and connected to a heavier cord, which is drawn back through the conduit. The electrical conducting wire is then connected to the lead end of the heavier cord and drawn back through the conduit to complete the wire pulling task.

Pressure is conventionally applied to electrical conduit either by $CO_2$ cartridges or apparatus which essentially consists of a reverse operating vacuum cleaner. Applying a partial vacuum to the conduit is effected by apparatus resembling a vacuum cleaner.

The apparatus presently in use for accomplishing these functions suffers a number of disadvantages, at least two of which are significant. First, the sequential pulling of progressively heavier pull lines or cords is extremely time consuming, particularly on longer conduit runs. The unnecessary consumption of time in this respect is wasteful and costly. Secondly, in conduit runs of any appreciable length, the pressure differential created by the equipment is either insufficient to move the carrier through the entire length of the conduit run or is insufficient to move the carrier through the last stages of the run with the necessary velocity. This often results in stoppage of the carrier plug in a conduit bend near the end of the run. Because the carrier plug decelerates as it gets further and further from the source of pressure, its position in the conduit cannot be ascertained with any accuracy, and if it becomes lodged in the conduit it remains an obstruction until additional time is spent in freeing it.

I have found that the reason that existing conduit pressurizing apparatus is inadequate resides primarily in the loss of pressure or inability to maintain sufficient pressure in the conduit. This is due to the fact that the pull line is introduced to the pressurizing apparatus from an external point; i.e., a point which lies outside the pressurized region. Typically, the pull line is introduced into the pressurized region through an opening in the pressure fitting which communicates directly with the conduit. If the opening is only slightly larger than the pull line, considerable friction or drag results as the pull line is drawn into the pressurized region, which appreciably reduces ability of the apparatus to move the carrier plug through the conduit. On the other hand, if the opening is large enough to reduce this friction or drag, then significant pressure drop result, thereby decreasing the ability of the pressurizing apparatus to move the carrier plug. For conduit runs which extend over substantial distances or which include a high number of bends, the conduit pressurizing apparatus which is presently available is ineffectual or at the very best inefficient.

My invention is the result of an endeavor to solve the foregoing problems and to provide line installing apparatus which operates in a simpler manner but more efficiently. Broadly stated, the invention resides in apparatus comprising a housing having an internal pressure chamber with an inlet and outlet, and an electrically operated blower disposed in the chamber which receives air from the inlet and delivers air under increased pressure to the outlet. A flexible hose terminating in a pressure fitting sealably engagable with the conduit mouth is connected to the chamber outlet. Line storage means adapted to receive a predetermined length of pull line are disposed in the chamber in essential alignment with the outlet, the lead end of the pull line passing through the outlet and flexible hose for removable connection to a conduit carrier.

In the preferred embodiment, the flexible hose includes a control handle having a switch to operate the blower. The pull line is stored in an internally wound, non-reusable roll, or on a reel the forward rotation of which is air assisted, and which is reversably rotated by a rewind motor. A level winding device insures orderly rewinding of the pull line on the reel, and a brake permits rotation of the reel only with operation of the blower.

The housing for the apparatus is preferably of the split type defining a single chamber, or defines two sub-chambers interconnected through a passage and float valve, permitting the apparatus to be additionally used as a wet or dry vacuum. Conventional filtration devices are included to insure clear and continuous blower operation.

Based on the more detailed description below, it will be appreciated that my inventive apparatus permits simple and efficient installation of an electrical conductor in a conduit run, notwithstanding length of the conduit or the number of bends.

BRIEF DESCRIPTION OF THE DRAWINGS

FIG. 1 is a view in side elevation of apparatus embodying the inventive principle;

FIG. 2 is a slightly enlarged view of the inventive apparatus taken in longitudinal section;

FIG. 3 is a sectional view taken along the line 3—3 of FIG. 2;

FIG. 4 is an enlarged, fragmentary sectional view showing internal structure of the apparatus handle;

FIG. 5 is a sectional representation of an alternative embodiment of the inventive apparatus viewed primary in section;

FIG. 6 is a sectional view taken along the line 6—6 of FIG. 5; and

FIG. 7 is an enlarged, fragmentary sectional view taken along the line 7—7 of FIG. 5.

DESCRIPTION OF THE PREFERRED EMBODIMENTS

With initial reference to FIGS. 1–3, a first embodiment of the inventive apparatus is represented generally by the numeral 11. Apparatus 11 specifically comprises a housing 12 which is formed from split sections 12a, 12b held tightly together by a plurality of over-center spring clips 13. Housing sections 12a, 12b are circular in cross section, but each tapers to some extent toward its respective end. As is shown in FIG. 2, the open end of housing section 12a defines an annular, peripheral groove 14 which receives the corresponding peripheral edge of housing section 12b.

Housing sections 12a, 12b are preferably formed from lightweight material of suitable strength, the objective being to provide a housing of substantial strength while retaining a lightweight characteristic. Housing section 12a includes a handle 15 for portability, and each of the housing sections 12a, 12b has a button or stud 16 integrally formed therewith to receive a carrying or hang up strap (not shown).

The end or bottom of housing section 12a has a circular opening over which a filter screen 17 is placed. An electrically operated blower 18 having an electric cord 20 is mounted within housing section 12a with its inlet communicating with external air through the filter screen 17 and circular opening. The outlet of blower 18 lies within the confines of housing 12 and thus serves to pressurize the internal chamber which it defines.

A cylindrical cartridge or container 19 is disposed within the housing 12, the container 19 having an open end facing the housing outlet. The cylindrical container 19 is coaxial with the housing 12 and is mounted to the housing section 12a by three equiangularly spaced legs 21 which project radially outward from the container 19 at its base. Screws 22 pass through the wall of housing section 12a into the respective legs 21, as is shown in FIGS. 2 and 3.

The container 19 is adapted to receive a roll of line or cord 23 the lead end of which is preferably internally unwound. As described, it will be appreciated that, with the housing sections 12a, 12b separated, container 19 projects well beyond the open end of housing section 12a and is itself open ended. In order to hold the line roll 23 in place when the housing sections 12a, 12b are secured together, three equiangularly spaced retention members 24 project inwardly from the inside face of housing section 12b. Preferably, the retention members are integrally formed with housing section 12b, and each is provided with a notch 25 which receives the peripheral edge of container 19 and enables the extreme portion of the retention member 24 to abuttably engage the line roll 23 and thereby precludes it movement.

The forward end of housing 12 terminates in a threaded opening which receives a short section of transparent tubing 26. The transparency of tubing 26 enables the user to ascertain whether the line 23 is moving.

A flexible hose 27 includes a pressure fitting 28 at each end, one of the fittings 28 being frictionally connected to the transparent tubing 26. The opposite fitting 28 receives an operational handle for the apparatus, which is generally designated 29.

Handle 29 comprises three sections, designated 29a, b, c, respectively. Handle section 29a is frictionally received by the pressure fitting 28 of hose 27, and is pivotally connected to the handle section 29b by a sealed connection 31. A similar sealed pivotal connector 32 joins handle sections 29b and 29c to permit overall flexibility. Handle section 29c terminates in a tapered pressure fitting preferably formed from a slightly resilient material, which is adapted for insertion into the mouth of a conduit (not shown) in sealable relation therewith.

Handle section 29b provides control for the apparatus 11. With additional reference to FIG. 4, handle section 29b is generally hollow or tubular, as are handle sections 29a and 29c, in order to permit the cord or twine 23 to pass therethrough. Handle section 29b includes a first recess in which a counter 33 is disposed. A removable transparent cover 34 conforming in shape to the handle section 29b and made from plexiglass or a similar material covers the recess and thereby protects the counter 33 during operation of the apparatus 11. Counter 33 includes a counting wheel 35 which is engaged and revolved by the cord or twine 23 as it moves through the section 29b. An idler wheel 36 mounted within handle section 29b forces the cord 23 into engagement with counting wheel 35. A suitable readout 37 indicates the length of line 23 passing through the handle section 29b, preferably in feet.

Handle section 29b includes a second recess in which a trigger switch 38 is mounted. Switch 38 is connected to the blower 18 by a suitable electrical conductor (not shown), thus permitting the user of the apparatus 11 to control blower 18 by depressing and releasing trigger switch 38.

In the operation of apparatus 11, the user initially releases the spring clips 13 and separates the housing sections 12a, 12b to insert the internally wound roll of line 23. As described above, the cylindrical cord container 19 is mounted to the housing section 12a, and the removal of housing section 12b permits the roll of line 23 to be properly inserted. Before joining the housing sections 12a, 12b, the lead end of the line 23 is threaded through the housing outlet, transparent tubing 26, flexible hose 27 and control handle 29. The housing sections 12a, 12b can then be joined, the retention members 24 thereby preventing the roll of line 23 from moving as the cord unwinds.

It is also possible to "thread" the apparatus 11 by simply inserting the lead end of line 23 through the apparatus outlet and into the flexible hose 27 before the hose 27 is attached to transparent tubing 26. Operation of the blower 18 will thus carry the line 23 through the hose 27 and control handle 29 for connection to the carrier.

Line 23 has a tensile strength of sufficient magnitude so that it can pull an electrical conductor through the conduit run. The lead end of line 23 is secured to a suitable carrier, not shown. The size of the carrier is chosen in accordance with the inside diameter of the conduit in which the electrical conductor is to be installed. Such carriers are commercially available in many different sizes.

The carrier is inserted into the mouth of the conduit, and the tapered end of the handle section 29c is then placed in sealable engagement with the conduit mouth. Trigger switch 38 can then be depressed, operating the blower 18 to pressurize the internal chamber of housing 12, such pressure being communicated through the hose 27 and control handle 29 to the conduit. Such pressure causes the carrier to move at high speed through the conduit, taking the line 23 with it. The transparent tubular section 26 gives the user a visual indication of movement of the line 23, as does counter 33. Thus, when the carrier reaches the junction box at the end of the conduit run, it leaves the conduit and line movement stops. THe user, observing through the transparent tubing section 26 that the line 23 is no longer moving, releases the trigger switch 38 to stop operation of the blower 18. Counter 33 indicates how much line has moved through the conduit, and thus apprises the user of the conduit length.

If the foregoing operation is performed on each conduit run on the particular job, it will be appreciated that the user will have an accurate indication of how many total feet of electrical conducting wire will be needed for the entire job.

Upon removal of the carrier, the lead end of line 23 is secured to suitable lengths of electrical conducting wires. Pulling the line 23 back through the conduit run thus installs the electrical conductors.

It will be appreciated that a single worker is entirely capable of carrying out a wire installing job without help. It is also possible for a single worker to install pull lines in all of the conduit runs on a given job, and for another worker or crew of workers to subsequently install the length of electrical conductors.

FIGS. 5-7 disclose an alternative embodiment of the inventive apparatus which is represented generally by the numeral 41. Apparatus 11 comprises an upright cylindrical container 42 which is somewhat larger than the housing 12 of apparatus 11 and is rollable on a plurality of caster wheels 43 secured to its bottom. Container 42 includes an annular platform 44 which is elevated from the container bottom, defining a chamber 50. A circular mounting plate 45 having a downwardly projecting strap 46 is bolted to the annular platform 44 and serves as a supportive mount for an electrically operated blower 47. Plate 45 has a circular opening centrally disposed therein which communicates with the inlet of blower 47.

The extreme bottom of cylindrical container 42 also has a centrally disposed circular opening and a circular cover plate 48 therefor. Plate 48 is secured in place by a threaded bolt 49 passing through the strap 46 and plate 48, and a wing nut 51. An annular air filter 52 is removably disposed with the chamber 50 between the mounting plate 45 and cover plate 48. Maintenance or replacement of the filter 52 is effected by removal of the wing nut 51 and cover plate 48.

As best shown in FIG. 5, cylindrical container 42 has an annular flange 53 projecting inwardly from its upper edge. A second cylindrical container 54 of lesser diameter than that of container 42 cooperates with the flange 53 at its upper end, extending downwardly into engagement with the annular platform 44. As described, the cylindrical containers 42, 54 and the flange 53 and platform 44 together define an annular chamber 55 which communicates with outside air through an inlet 56 mounted on the top of container 42. A pair of channel members 57 (FIG. 6) disposed between containers 42 and 54 and extending from the flange 53 to an intermediate point within chamber 55 cause inlet air to be diverted downwardly, as indicated by flow arrows.

Diametrically across from the inlet 56 is a duct member 58 establishing communication between chambers 55 and 50. With specific reference to FIG. 6, duct member 58 is generally rectangular in cross section although slightly arcuate to conform to the outer surface of cylindrical container 54 to which it is secured. The extreme upper end of duct member 58 has an overhang 59 defining a downwardly facing inlet. Preferably, the inlet of duct member 58 is at least as great in cross sectional area as that of the blower 18 in order for the blower output to be unrestricted. With specific reference to FIGS. 5 and 7, a float valve member 61 having a pair of vertical slots is vertically movable relative to a pair of mounting pegs 62 which are secured to the duct member 58. In the position shown in FIG. 5, float valve member 61 permits inlet air from chamber 55 to enter the inlet of duct member 58 and to be conducted to chamber 50. With float valve member 61 in its upper position, as will be described in further detail below, the inlet to duct member 58 is sealed.

A hemispherical transparent dome 63 sealably cooperates with the cylindrical container 42. As is shown in FIG. 5, the circumferential edge of dome 63 is curved upwardly to receive the latching portion of a plurality of over-center spring clips 64. Dome 63 includes a centrally disposed outlet 65 which is adapted to receive the fitting 28 of a flexible hose 27 which may be the same as that for apparatus 11.

A pair of cross supporting straps 66 are secured to the inner face of cylindrical member 54 immediately above the blower 47. A third cylindrical container 67 having a closed bottom and open top is carried by the cross support strap 66. The cylindrical container 66 in turn carries a pair of parallel wall members 68 in which a reel 69 is journaled. Reel 69 is adapted to receive a desired length of cord or line 71 similar to the line 23 disclosed in connection with apparatus 11. As is shown in FIG. 5, the line 71 leads from the reel 69 outwardly through outlet 65 and into a flexible hose in the same manner as apparatus 11. The inclusion of reel 69 in apparatus 41 permits the line 71 to be used over and over through rewinding. High speed rewinding of the line 71 is effected by an electric motor 72 which is driven in one direction by an internal clutch or the like, but which is disengaged in the opposite direction to prevent drag on the reel 69. Motor 72 is mounted on one of the wall members 68, including an output bevel gear 73 which cooperates with a like bevel gear 74 on the reel shaft. Motor 72 is operated by an independent switch, not shown, which is preferably disposed on the control handle 29, or which could also be mounted on the apparatus 41 itself.

In order for the line 71 to be properly rewound on reel 69, a conventional helically wound, level winding device 75 is journaled between the parallel wall members 68. The device 75 includes a reciprocating guide 76 through which the line 71 passes to be rewound in the known manner.

It is essential that the line 71 be unwound from the reel 69 with the least possible drag in order that movement of the line carrier in the conduit be impeded as little as possible. Because the reel 69 has inherent frictional drag, an air diffuser tube 77 is provided which receives air under pressure from the chamber in which blower 47 is located and directs such air toward the reel 69 in a manner which assists in its forward rotation. Diffuser tube 77 is suitably secured to cylindrical container 67 and extends in a direction essentially parallel with the rotational axis of reel 69. A flared inlet 78 is disposed one end of the tube 77, external of the cylindrical container 67, and facing downward to collect air generated under pressure by blower 47. Diffuser tube 77 includes three spaced outlets 79 within cylindrical container 67, each of which is angularly disposed (see FIG. 6) so that air issuing therefrom will strike the reel 69 somewhat tangentially to assist in its forward rotation.

A solenoid 81 is mounted on one of the wall members 68 in a position remote from the rotational axis of reel 69. Solenoid 81 has a rubber tipped plunger 82 which projects through wall member 68 and is normally biased into engagement with one end flange of the reel 69 to preclude rotation. Solenoid 81 is electrically connected to be actuated to a reel-release or nonbraking position with operation of blower 47.

The particular instruction of apparatus 41 permits its usage either as a wet pickup vacuum cleaner or to pressurize conduit in the installation of an electrical conductor. In the vacuum mode, a flexible hose with a suitable vacuum pickup attachment is connected to the inlet 56, the outlet 65 being left open to permit the escape of air. As is represented by the arrows, air enters the inlet 56 and is diverted downwardly by the channel members 57. The air then moves around the annular chamber 55 to the other side, entering the inlet of duct member 58 and passing into the chamber 50. From here, the air is filtered by the annular filter 52 and is then moved upwardly through the blower 47, cylindrical container 54, dome 63 and out through the outlet 65. Accordingly, apparatus 41 acts as a vacuum cleaner, depositing debris picked up in chamber 55. Blower 47, motor 72 and solenoid 81 are effectively insulated from any liquid which may be picked up and deposited in chamber 55. In such case that chamber 55 fills with water, float valve member 61 moves to its upper position to close the inlet to duct member 58, thus precluding water from reaching chamber 50 and the electrically operated components. The closure of the inlet to duct member 58 impedes the flow of air through apparatus 41, thus stopping the vacuum effect. Chamber 55 must then be emptied before the vacuuming process can continue. Liquid, Dirt and other debris is removed from chamber 55 through a side opening in cylindrical container 42 which is sealably closed by a hinged door 83.

Operation of the apparatus 41 to install a pull line in a conduit run is similar to that of the apparatus 11. Initially, line 71 is threaded through the dome outlet 65, hose 27 and control handle 29. Hose 27 is then secured to the dome outlet 65 by one of the pressure fittings 28, and the lead end of line 71 is secured to a suitable line carrier. The carrier is inserted into the conduit a short distance, and handle section 29c is placed in sealable engagement with the conduit mouth. Depression of the trigger 38 operates blower 47 to generate pressure within the removable transparent dome 63, which is transferred to the conduit. Simultaneously, solenoid 81 is actuated, retracting rubber tipped plunger 82 from its braking position, thus permitting reel 69 to rotate. Forward rotation of the reel 69 is assisted by air issuing from the outlets 79 of defuser tube 77. Accordingly, reel 69 rotates freely, providing as much of cord 71 as is demanded by the moving carrier in the conduit.

As the carrier moves through the conduit run, the operator continuously observes the movement of line 71 and operation of reel 69 through the transparent dome 63, or from operation of the counter. When the carrier reaches the junction box at the end of the conduit run, it falls free and releases pressure from the conduit. As soon as the operator ascertains that the carrier is not longer moving, he releases trigger 38. This not only stops operation of the blower 47, but also allows the rubber tipped plunger 82 of solenoid 81 to extend into braking engagement with the end flange of reel 69. This immediately halts rotation of reel 69, preventing excessive cord 71 from being released and thereby avoiding backlash. Counter 33 indicates the length of line dispensed, and hence the length of the conduit run. Because of the extreme high cost of copper wire, this measurement assists both journeymen and contractors in ordering proper footage of wire for a desired job. It is known that conduit is rarely installed in accordance with the route taken from a blueprint. Therefore, copper wire of the larger sizes is usually ordered in desired lengths after the conduit is installed.

After cord 71 has been used to draw conducting wire through the conduit, as described above, motor 72 is actuated to rewind the extended line 71 on reel 69, the rewinding device 75 serving to receiprocally guide the cord 71 in layered rows. If desired, a more powerful rewind motor and corresponding mounting bracket could be installed for use as a wire puller at the same time the rewinding process is taking place.

I claim:

1. Apparatus for installing a pull line into a length of conduit or the like, comprising:
   a. a housing defining a pressure chamber with an inlet and an outlet;
   b. pressure generating means disposed within the pressure chamber for receiving air from the inlet and forcing air under pressure through the outlet;
   c. line storage means disposed within the housing in essential alignment with the chamber outlet for receiving and storing a predetermined length of pull line therein;
   d. flexible hose means connected to the chamber outlet, the hose means terminating in a pressure fitting constructed for sealable engagement with the conduit; and,
   e. means for controlling operation of the pressure generating means.

2. The apparatus defined by claim 1, wherein the pressure generating means comprises an electrically operated blower, and the controlling means comprises a control handle connected to and forming part of the flexible hose means, the control handle including an electric switch operably connected to the blower.

3. The apparatus defined by claim 2, wherein the electric switch is trigger operated.

4. The apparatus defined by claim 2, wherein the control handle is pivotally and sealably connected to the flexible hose means, and the pressure fitting is pivotally and sealably connected to the control handle.

5. The apparatus defined by claim 2, and further comprising counter means disposed in the control handle for indicating the length of line passing therethrough.

6. The apparatus defined by claim 1, and further comprising counter means for determining the amount of line passing through the flexible hose means and for indicating the length thereof.

7. The apparatus defined by claim 1, wherein the housing comprises a transparent portion disposed to permit visual observation of the pull line.

8. The apparatus defined by claim 1, wherein the housing comprises sealably connected section halves together defining said pressure chamber, the section halves being separable to permit access to the line storage means.

9. The apparatus defined by claim 8, wherein the line storage means comprises a cartride container carried by one the housing section halves and having an open end facing the housing outlet, the cartridge container being adapted to receive a roll of pull line.

10. The apparatus defined by claim 9, wherein the line storage means further comprises retention means carried by the other of said housing section halves for at least partially overlying the open end of the cartridge container to retain a roll of pull line during operation of the apparatus.

11. The apparatus defined by claim 1, wherein:
  a. the pressure chamber comprises first and second interconnected pressure chambers, the housing inlet being associated with the first pressure chamber and the housing outlet being associated with the second pressure chamber;
  b. the pressure generating means comprises an electrically operated blower disposed in the second pressure chamber, whereby the apparatus is capable of use as a wet or dry pickup vacuum;
  c. and further comprising means for preventing liquid from passing from the first pressure chamber to the second pressure chamber, thereby precluding damage to said blower.

12. Apparatus for installing a pull line into a length of conduit or the like, comprising:
  a. a housing defining a pressure chamber with an inlet and outlet;
  b. pressure generating means disposed within the pressure chamber for receiving air from the inlet and forcing air under pressure through the outlet;
  c. flexible hose means connected to the chamber outlet, the hose means terminating in a pressure fitting constructed for sealable engagement with the conduit;
  d. line storage means disposed within the housing in essential alignment with the chamber outlet, the line storage means including a predetermined length of pull line dispensable therefrom, the lead end of the pull line passing through the chamber outlet and flexible hose means and adapted for connection to a pull line carrier movable through the conduit on application of pressure; and,
  e. means for controlling operation of the pressure generating means, whereby said conduit is pressurized to move the carrier and pull line therethrough.

13. The apparatus defined by claim 12, wherein the line storage means comprises a storage reel rotatably mounted in said pressure chamber, the pull line being wound on the reel and dispensable as the reel rotates.

14. Apparatus for installing a pull line into a length of conduit or the like, comprising:
  a. a housing defining a first chamber having an inlet and a second chamber having an outlet and means for establishing fluid communication between the first and second chambers;
  b. electrically operated blower means disposed in the second chamber for receiving air from the first chamber inlet and forcing air under pressure through the second chamber outlet;
  c. flexible hose means connected to the second chamber outlet and terminating in a pressure fitting constructed for sealable engagement with the conduit;
  d. a line storage reel rotatably mounted in the second chamber in essential alignment with said outlet, the line storage reel including a predetermined length of pull line wound thereon and dispensable therefrom, the lead end of the pull line passing through the second chamber outlet and the flexible hose means and adapted for connection to a pull line carrier; and,
  e. switch means for controlling operation of the blower means.

15. The apparatus as defined by claim 14, and further comprising means for rewinding pull line on the storage reel.

16. The apparatus defined by claim 15, wherein the rewinding means comprises an electric motor operably connected to the storage reel and second switch means for controlling operation of the motor.

17. The apparatus defined by claim 16, and further comprising means for guiding the pull line as it is rewound on the storage reel.

18. The apparatus defined by claim 14, and further comprising brake means associated with the line storage reel and selectively moveable between reel braking and nonbraking positions.

19. The apparatus defined by claim 18, wherein the brake means comprises a solenoid having a plunger normally extended to a position of frictional engagement with the storage reel, and said switch means causes retraction of the plunger simultaneous with operation of the blower means.

20. The apparatus defined by claim 14, and further comprising air diffuser means for receiving air under pressure from the blower means and directing such air generally tangentially toward the line storage reel to assist rotation thereof.

21. The apparatus defined by claim 14, wherein the housing comprises an upright cylindrical container, the second chamber being concentrically disposed within the first chamber.

22. The apparatus defined by claim 21, wherein the housing further comprises a transparent dome sealably connected to the cylindrical container in communication with the second chamber, said outlet being centrally disposed in the top of said transparent dome.

23. The apparatus defined by claim 14, and further comprising means for preventing liquid from passing from the first pressure chamber, thereby precluding damage to said electrically operated blower means.

* * * * *